US008483286B2

(12) United States Patent
Wang

(10) Patent No.: US 8,483,286 B2
(45) Date of Patent: Jul. 9, 2013

(54) BATCH PROCESSING OF MEDIA CONTENT

(75) Inventor: Titan (Taisan) Wang, Taipei County (TW)

(73) Assignee: Cyberlink Corp., Shindian, Taipei (TW)

( * ) Notice: Subject to any disclaimer, the term of this patent is extended or adjusted under 35 U.S.C. 154(b) by 524 days.

(21) Appl. No.: 12/913,393

(22) Filed: Oct. 27, 2010

(65) Prior Publication Data

US 2012/0106651 A1 May 3, 2012

(51) Int. Cl.
*H04N 7/12* (2006.01)
*H04B 1/66* (2006.01)

(52) U.S. Cl.
USPC .................................. 375/240.25; 375/240

(58) Field of Classification Search
USPC ................................................. 375/240.25
See application file for complete search history.

(56) References Cited

U.S. PATENT DOCUMENTS

| | | | |
|---|---|---|---|
| 5,471,450 A | 11/1995 | Yonemitsu et al. | |
| 5,481,543 A | 1/1996 | Veltman | |
| 5,612,900 A | 3/1997 | Azadegan et al. | |
| 5,613,162 A | 3/1997 | Kabenjian | |
| 5,629,866 A | 5/1997 | Carrubba | |
| 5,668,916 A * | 9/1997 | Fujinami | 386/248 |
| 5,793,431 A | 8/1998 | Blanchard | |
| 5,805,821 A | 9/1998 | Saxena et al. | |
| 6,016,166 A | 1/2000 | Huang et al. | |
| 6,246,720 B1 | 6/2001 | Kutner et al. | |
| 6,430,591 B1 | 8/2002 | Goddard | |
| 6,573,898 B1 | 6/2003 | Mathur et al. | |
| 7,100,057 B2 | 8/2006 | Won | |
| 7,312,800 B1 | 12/2007 | Gies et al. | |
| 7,330,916 B1 | 2/2008 | Kirk | |
| 7,356,079 B2 * | 4/2008 | Laksono et al. | 375/240.03 |
| 7,379,592 B2 | 5/2008 | Miller | |
| 7,634,227 B2 * | 12/2009 | de Jong | 455/3.06 |
| 7,885,472 B2 * | 2/2011 | Yamamoto | 382/232 |
| 8,218,439 B2 * | 7/2012 | Deshpande | 370/235 |
| 2003/0140159 A1 | 7/2003 | Campbell et al. | |
| 2004/0054892 A1 | 3/2004 | Ji et al. | |
| 2005/0071491 A1 * | 3/2005 | Seo | 709/231 |
| 2005/0185526 A1 | 8/2005 | Altare | |
| 2006/0026294 A1 * | 2/2006 | Virdi et al. | 709/232 |
| 2007/0092224 A1 | 4/2007 | Tsukagoshi et al. | |
| 2007/0116117 A1 | 5/2007 | Tong et al. | |
| 2008/0145028 A1 | 6/2008 | Nakamuta | |
| 2009/0052542 A1 | 2/2009 | Romanovskiy et al. | |
| 2010/0135417 A1 * | 6/2010 | Hargil | 375/240.25 |

* cited by examiner

*Primary Examiner* — Joseph Ustaris
*Assistant Examiner* — Anner Holder
(74) *Attorney, Agent, or Firm* — McClure, Qualey & Rodack, LLP

(57) ABSTRACT

A system and method for processing media are provided. For example, a media player comprises a media source including a video data stream, a timer, and a video decoder including a video decoder buffer that is configured to store at most an m-second segment of the video data stream received from the media source. Also, the media player comprises a video renderer including a video renderer buffer that is configured to store at most an n-second segment decoded by a video decoder. The media source is configured to calculate the transfer time corresponding to a completion of sending the m-second segment to be p-seconds. The media source is further configured to set the timer for a standby time for returning to a working mode, and the standby time is equal to (m−p) seconds. The media source is configured to transition to a standby mode after setting the timer.

28 Claims, 12 Drawing Sheets

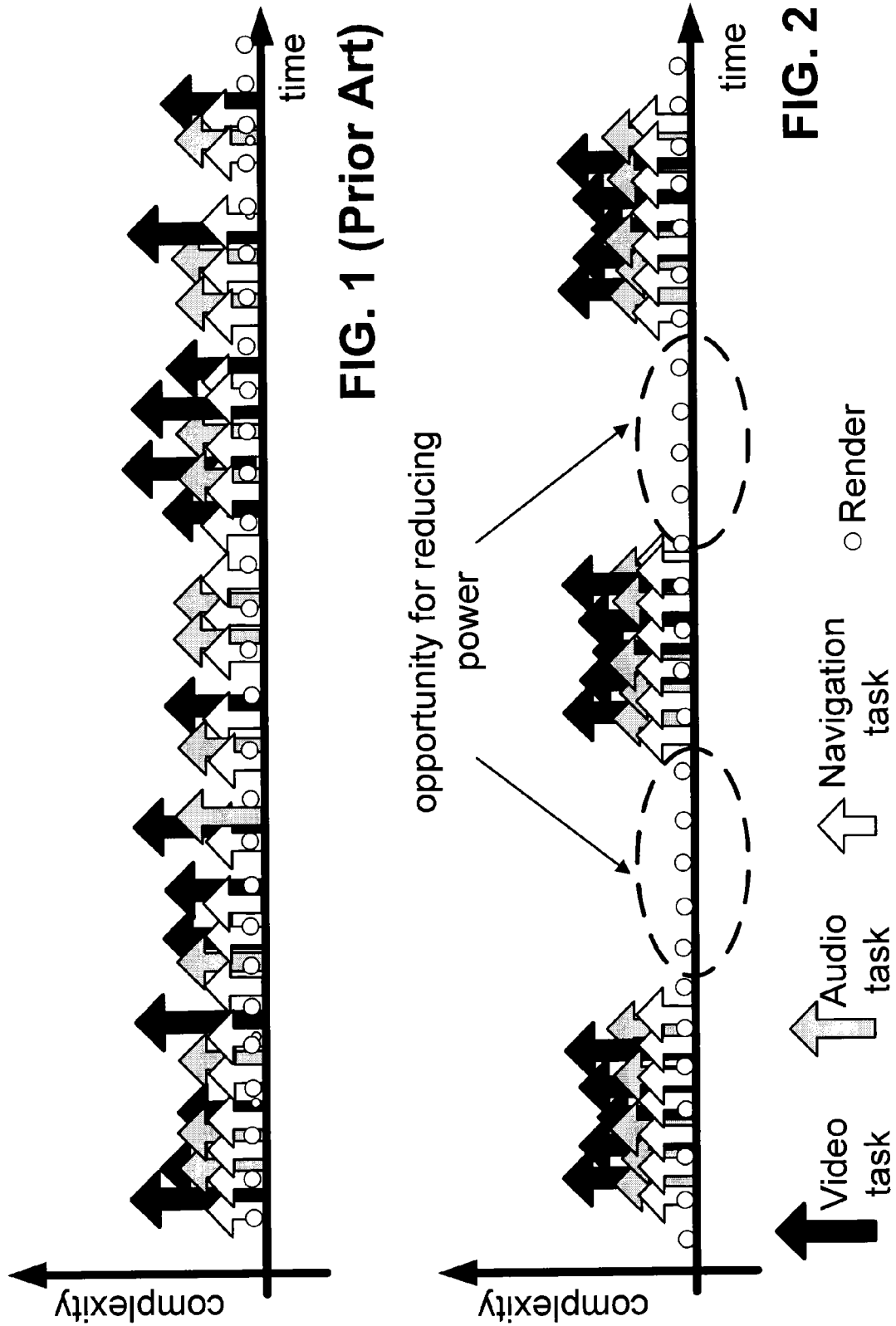

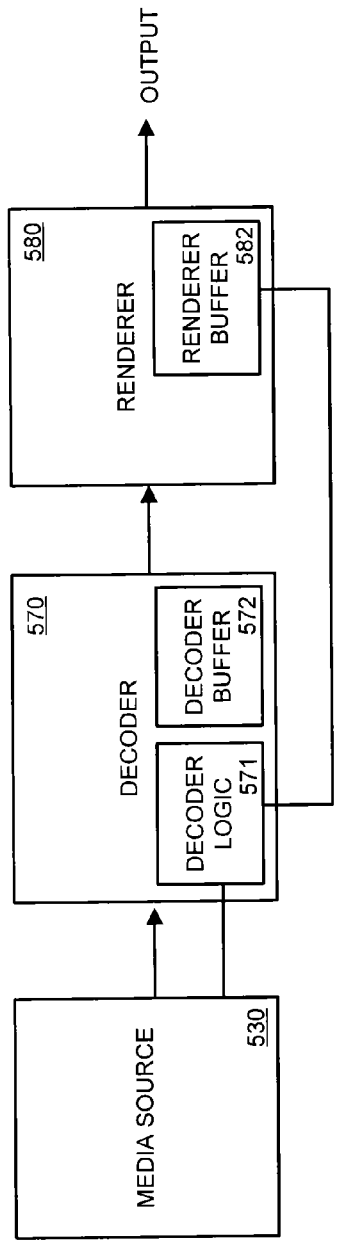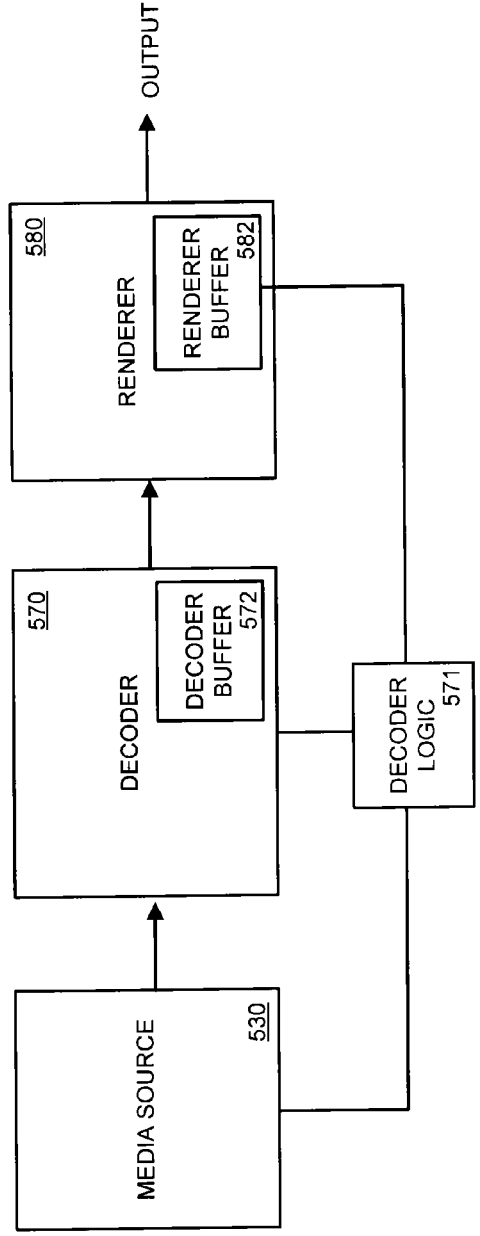

BATCH PROCESSING OF MEDIA CONTENT

TECHNICAL FIELD

Embodiments disclosed herein are generally related to playing media content and, more particularly, are related to decoding and rendering media content.

BACKGROUND

Video and audio players, such as DVD players and computers, are popular entertainment devices for enjoying media. When in operation, these players continuously process audio and video digital signals to provide a continuous moving image and sound. FIG. 1 is a graph showing the complexity of a variety of processing tasks of a conventional video and audio player in operation versus time, which illustrates how the various processing tasks occur continuously when the player is in operation.

In the past, these players have operated at full power while continuously processing the digital signals. However, energy can be expensive and may require the use of natural resources. Further, a player operating continuously at full power can get hot, requiring the use of a noisy fan to reduce the temperature of the player.

SUMMARY

Embodiments described in the present disclosure provide systems and methods for batch decoding. Briefly described, in one embodiment, among others, a method of providing an opportunity for saving power in a media player having a processor by controlling the processor usage is provided. The method comprises sending a data stream from a media source to a decoder having a decoder buffer; stopping the sending of the data stream from the media source when the decoder buffer of the decoder is substantially full; decoding data stored in the decoder buffer using the decoder; sending decoded data to a renderer having a renderer buffer; stopping the decoding of the data when the renderer buffer is substantially full; determining, using a decoder logic, whether the decoded data stored in the renderer buffer is almost depleted, wherein the determining includes calculating a data transfer rate; responsive to a determination by the decoder logic that decoded data stored in the renderer buffer is almost depleted, notifying the media source to resume sending the data stream to the decoder; and repeating the decoding and rendering steps.

Also provided, in another embodiment, is a method of playing media in a media player. The method comprises sending a first data stream segment from a media source to a decoder, the first data stream segment have a decode time of m-seconds; stopping the sending of the first data stream segment from the media source; transitioning to a standby mode at the media source; storing the first data stream segment in a decoder buffer, the decoder buffer including a m-second duration length buffer; decoding the first data stream segment in the decode time using the decoder; sending the decoded first data stream segment from the decoder to a renderer; storing the decoded first data stream segment in a renderer buffer, the renderer buffer including a n-second duration length buffer; rendering the decoded first data stream segment stored in the renderer buffer in a render time using the renderer; and resuming the sending step by sending a second data stream segment from the media source to the decoder after a timer period based at least in part on a lead time.

Also provided, in another embodiment, is a media player. The media player comprises a media source including a data stream and a decoder including a decoder buffer and a decoder logic. The media source is further configured to stop sending the data stream when the decoder buffer is substantially full. The decoder is configured to send decoded data to the renderer. Additionally, the media player comprises a renderer including a renderer buffer. The renderer buffer is configured to store decoded data. The decoder is configured to stop decoding data when the renderer buffer is substantially full. The media source is configured to stop sending the data stream when the decoder buffer is substantially full. The decoder logic is configured to determine whether the renderer buffer is almost depleted including calculate a data transfer rate. The decoder logic is further configured to send a notification to the media source responsive to a determination that the renderer buffer is almost depleted. The notification notifies the media source to resume sending the data stream to the decoder.

As another example, a media player comprises a media source including a data stream. The media player further comprises a decoder including a decoder buffer. The media source is configured to send a first data stream segment having a decode time of m-seconds from a media source to a decoder. The media source is further configured to transition to a standby mode after sending the first data stream segment. The decoder buffer is configured to store at most an m-second data stream segment. The media player further comprises a renderer including a renderer buffer. The renderer buffer is configured to store at most an n-second segment of the data stream decoded by a decoder. The renderer is configured to render the n-second segment in a render time. The media source is configured to send a data stream segment from the media source to the decoder after a timer period based at least in part on a lead time.

Other systems, methods, features, and advantages of embodiments described in the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the various embodiments described in the present disclosure. Moreover, in the drawings, like reference numerals designate corresponding parts throughout the several views.

FIG. 1 is a graph illustrating the complexity of a variety of processing tasks of a conventional video and audio player in operation versus time.

FIG. 2 is a graph illustrating the complexity of a variety of processing tasks of an embodiment of a device for processing media in operation versus time.

FIGS. 7-9 are block diagrams illustrating examples of the flow of data in the media player according to the embodiment illustrated in FIG. 6.

DETAILED DESCRIPTION

Figure 3:
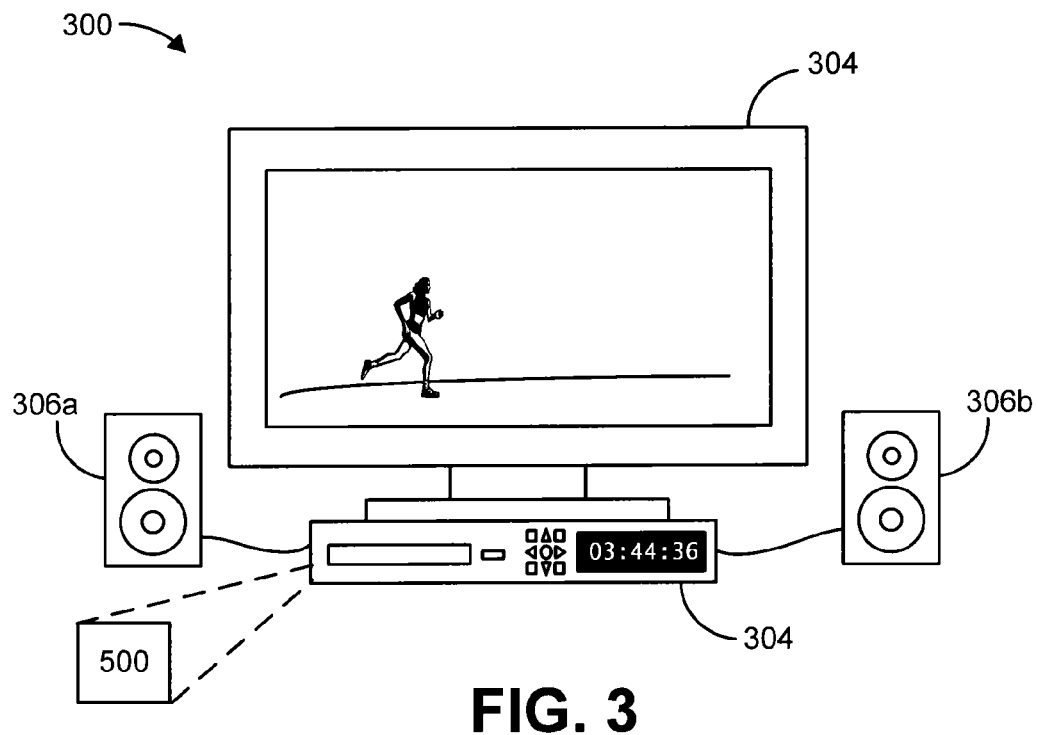
FIG. 3 is a diagram illustrating a non-limiting example of an entertainment system including an embodiment of a device for processing media.

The following disclosure describes a system, device, and/or method for processing media. As a nonlimiting example, the media is sent to a decoder from a media source and decoded in batches instead of continuously. When a batch of media is not being sent by the media source or processed by a decoder, opportunities for saving power are provided to the system or device. In this way, during operation, the renderer is continuously (i.e., without pausing) rendering as illustrated in FIG. 2 and, thus, an image is continuously displayed, but the media source and decoder need not be continuously powered, resulting in opportunities for saving power.

In some embodiments, the opportunity for saving power is provided by including a decoder logic that monitors the capacity of a decoder buffer and renderer buffer. When the decoder buffer is full, the decoder logic notifies the media source that streaming to the decoder buffer may be paused, and the decoder logic notifies the media source to resume streaming when the decoder buffer becomes almost depleted. Similarly, when the renderer buffer is full, the decoder logic pauses the stream of decoded data sent to the renderer buffer, and the decoder logic resumes the stream of decoded data to the renderer buffer when the renderer buffer becomes almost depleted.

The decoder logic determines whether the decoded data stored in the renderer buffer is almost depleted by determining when the render time needed to render the decoded data stored in the renderer buffer is equivalent to the renderer buffer size (measured in units of time) divided by the data transfer rate. The data transfer rate is the rate at which data is transferred from the media source to the renderer. Accordingly, the data transfer rate is a function of the rate that data is transferred from the media source to the decoder and from the decoder to the renderer.

In other embodiments, the opportunity for saving power is provided by sending a bitstream segment from the media source to the decoder that has a discrete length. Then, the streaming from the media source is paused and enters a standby mode for a length of time corresponding to a timer period. The decoder decodes the bitstream segment stored in the decoder buffer and sends the decoded data to the renderer buffer, which in some embodiments has a capacity that is larger than the capacity of the decoder buffer. Then, the decoder may pause the streaming of the decoded data and also transition to a standby mode. After the expiration of the timer period, the media source will awaken before the renderer has finished rendering the decoded data stored in a renderer buffer. The timer period is defined such that there is enough lead time for the media source to transfer data to the decoder, the decoder to decode the data and transfer the decoded data to the renderer. In this way, during operation, the renderer is continuously (i.e., without pausing) rendering and, thus, the image is continuously displayed, but the media source and decoder need not be continuously powered.

FIG. 3 illustrates a diagram of a nonlimiting example of a media player included in an entertainment system according to an embodiment of the present disclosure. In the embodiment illustrated in FIG. 3, the entertainment system 300 includes a display 302 (video output), a media player 304, and speakers 306a, 306b (audio output). The display 302 includes a plasma screen, a liquid crystal display (LCD) screen, a high definition television (HDTV) screen, and/or a digital light processing television (DLP TV) screen, for example. In other embodiments, instead of including one of the screens described above, the display 302 is an image projected by a video projector.

The media player 304 is configured to play media content from one or more of a variety of media, such as an optical disc, flash memory disk, a hard drive, and/or one or more of a variety of storage media. The media may be a managed copy. Also, it should be noted that the media content is in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

The media content stored on the media may be encoded according to a constant bitrate or a variable bitrate. If the media content is encoded according to a constant bitrate, the m-second of data segment size can be determined based at least in part on the constant bitrate. In contrast, if the media content is encoded according to a variable bitrate, the media source 530 can parse the data stream and determine a decode time stamp (DTS) or a present time stamp (PTS) to determine the m-second of data segment size. In some embodiments, the data segment size is different for audio content and video content. In those embodiments, the data segment sizes for audio content and video content (e.g., m-seconds and m'-seconds, respectively) can be determined separately in the manner discussed above based on whether the media content is encoded according to a constant bitrate or a variable bitrate.

In some embodiments, the media player 304 is an optical disc player, such as a CD player, a DVD player, BD player (e.g., Sony Playstation III), BD-Live disc player, an iHD player (e.g., Microsoft Xbox) or one of a variety of other optical disc players. In those embodiments, the optical disc is a magneto-optical disc, a blue-ray disc (BD), a blue-ray disc rewritable (BD-RE), a blue-ray disc write-once (BD-R), a blue-ray disc Live (BD-Live), a high-definition digital video disc (HD DVD), a high-definition digital video disc rewritable (HD DVD-RW), a high-definition digital video disc random access memory (HD DVD-RAM), a high-definition digital video disc recordable (HD DVD-R), a digital video disc (DVD), a digital video disc rewritable (DVD-RW), a digital video disc rewritable (DVD+RW), a digital video disc recordable (DVD-R), a digital video disc once-writeable (DVD+R), a digital video disc random access memory (DVD-RAM), a holographic versatile disc, a universal media disc, a versatile multi-layer disc, a enhanced versatile disc (EVD), a compact disc (CD), a compact disc recordable (CD-R), or a compact disc rewritable (CD-RW).

In some embodiments, the media player 304 is a digital video recorder (DVR) including a hard drive in addition to, or instead of, reading and playing media stored on an optical disc. The optical disc or the hard drive storing the media serves as the media source. Additionally, the media player 304 includes a device 500 for processing media, which will be discussed below in further detail with respect to FIG. 5.

Figure 4:
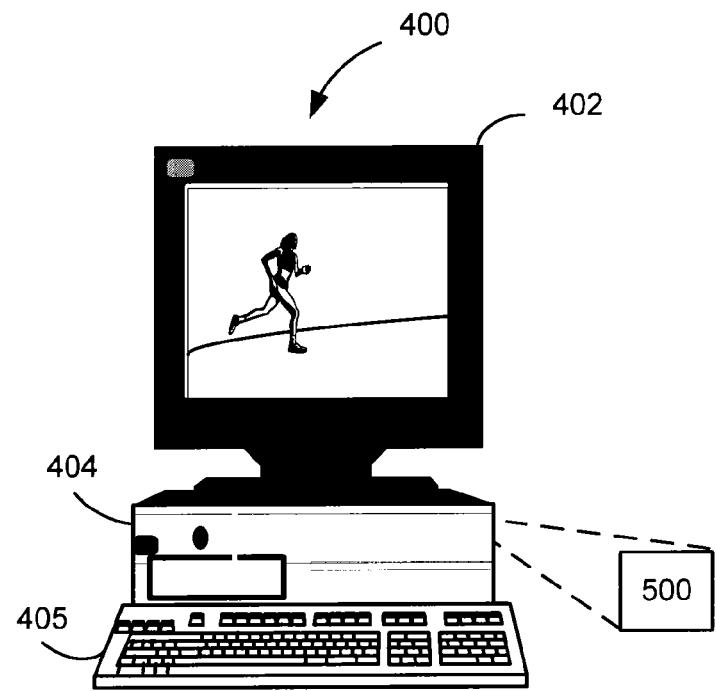
FIG. 4 is a diagram illustrating a non-limiting example of a personal computer including an embodiment of a device for processing media.

FIG. 4 illustrates a diagram of a nonlimiting example of a media player included in a personal computer according to another embodiment of the present disclosure. In the embodiment illustrated in FIG. 4, the personal computer 400 includes a display 402, a media player 404, and a user input device 405. In the embodiment illustrated in FIG. 4, the user input device 405 is a keyboard. In some embodiments, additional and/or different user input devices such as a mouse, a touchscreen, a microphone, and/or one or more of a variety of other devices capable of providing an input to a media player 404 are included. The display 402 and the user input device 405 are coupled to the media player 404. The media player 404 includes a device 500 for processing media content, which will be discussed below in further detail with respect to FIGS. 5A-5B.

Figure 5A:
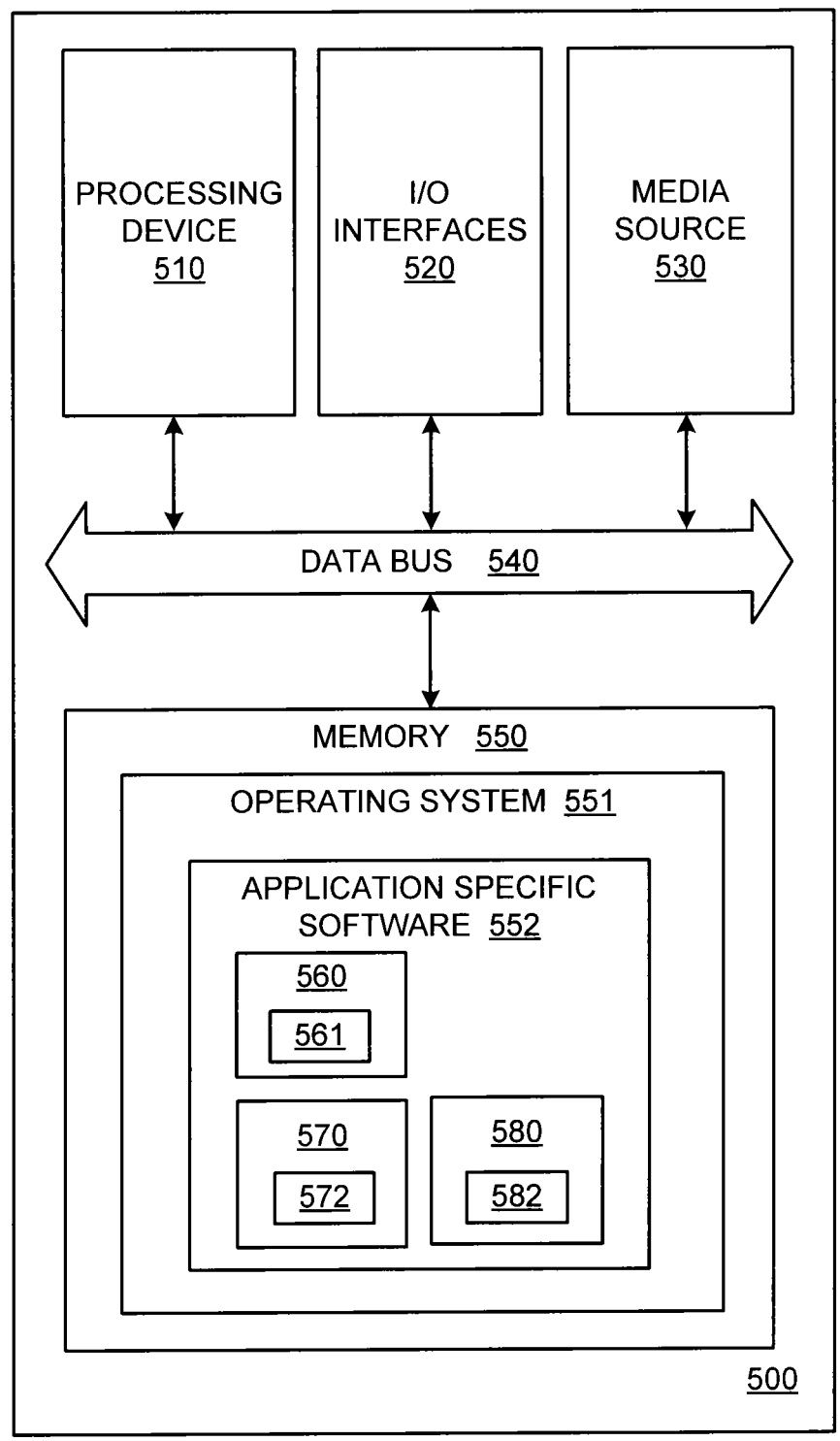
FIGS. 5A-5B are block diagrams illustrating a non-limiting examples of a device for processing media.
Figure 5B:
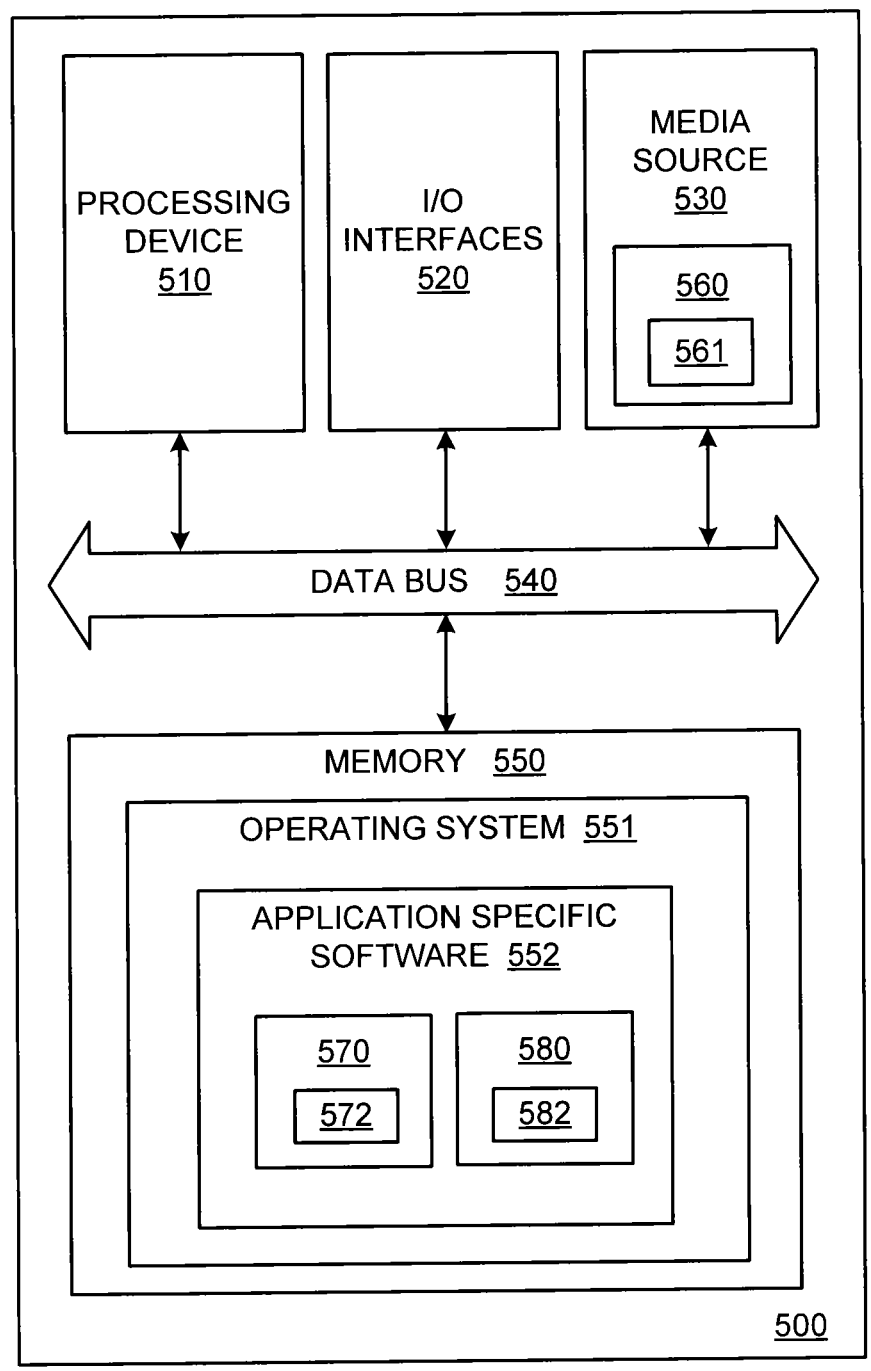

FIGS. 5A-5B illustrate block diagrams of nonlimiting examples of a device 500 for processing media. In some embodiments, the device 500 for processing media is included in an entertainment system such as, for example, the entertainment system 300 illustrated in FIG. 3. In other embodiments, the device 500 for processing media is included in a personal computer such as, for example, the personal computer 400 illustrated in FIG. 4.

In the nonlimiting example shown in FIG. 5A, the device 500 for processing media includes a processing device 510, I/O interfaces 520, a media source 530, a data bus 540, and a memory 550. In some embodiments, the device 500 for processing media further includes a network interface. The processing device 510 is configured to execute software stored in an operating system 551, including an application specific software 552. The processing device 510 includes a custom-made or commercially-available processor, a central processing unit (CPU), an auxiliary processor among several processors, a semiconductor based microprocessor (in the form of a microchip or chip set), a macroprocessor, and/or generally any device for executing the instructions of the application specific software 552. When the device 500 for processing media is in operation, the processing device 510 executes the application specific software 552, communicates data to and from the memory 550 over the data bus 540, and generally controls the operation of the device 500 for processing media pursuant to the application specific software 552.

As illustrated in the embodiment in FIG. 5A, the application specific software 552 includes a media source logic 560, a decoder 570, and a renderer 580. The media source logic 560 includes a timer 561. In some embodiments, the application specific software 552 includes various sets of decoders 570 and renderers 580. For example, the application specific software 552 may include an audio decoder, an audio renderer, a video decoder, a video renderer, a subtitle decoder, a subtitle renderer, and/or one of a variety of other decoders 570 and renderers 580. Also, in some embodiments, such as the one illustrated in FIG. 5B, the media source 530 includes the media source logic 560 instead of the application specific software 552, as illustrated in the nonlimiting example shown in FIG. 5B. The media source logic 560 includes the timer 561.

The I/O interfaces 520 provide any number of interfaces for the input and output of data to and from the device 500 for processing media. For example, referring to FIG. 4, data is sent from a user input device 405 to the processing device 510, and data is sent from the processing device 510 to the display 402. The memory 550 may include any one of a combination of volatile memory elements (e.g., random-access memory (RAM), such as DRAM, and SRAM, etc.)) and/or nonvolatile memory elements (e.g., read-only memory (ROM), hard drive, tape, etc.). The memory 550 includes the operating system 551 as well as one or more applications, emulation systems, or emulated applications for any of a variety of operating systems and/or emulated hardware platforms, emulated operating systems, etc. For example, the applications stored in the operating system 551 include the application specific software 552. One of ordinary skill in the art will appreciate that the memory 550 can, and typically will, comprise other components, which have been omitted for purposes of brevity.

In some embodiments, the application specific software 552 can be stored on a variety of computer-readable media for use by, or in connection with, a variety of computer-related systems or methods. In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

Figure 6:
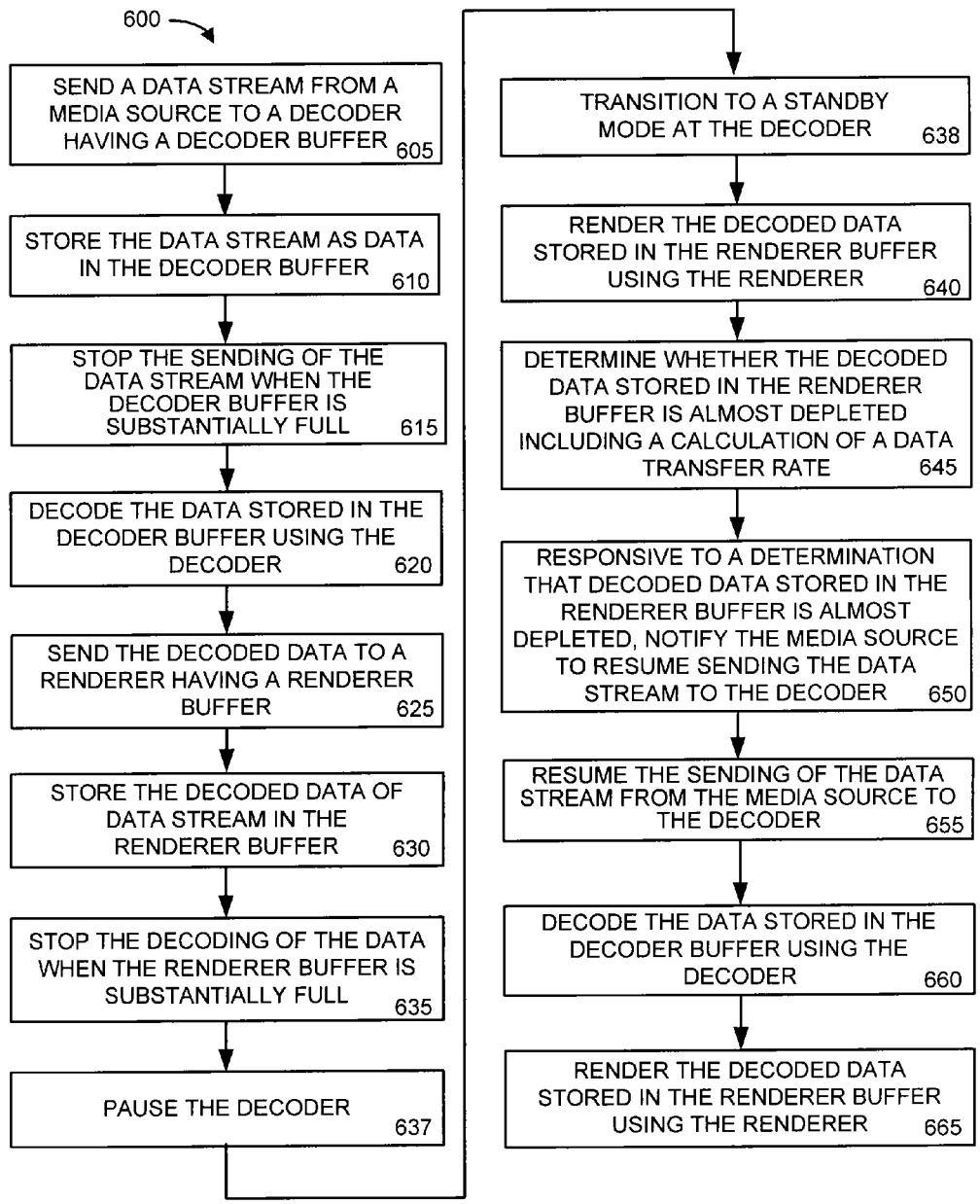
FIG. 6 is a flow chart illustrating a first embodiment of a method of providing an opportunity for saving power in a media player.
Figure 9:
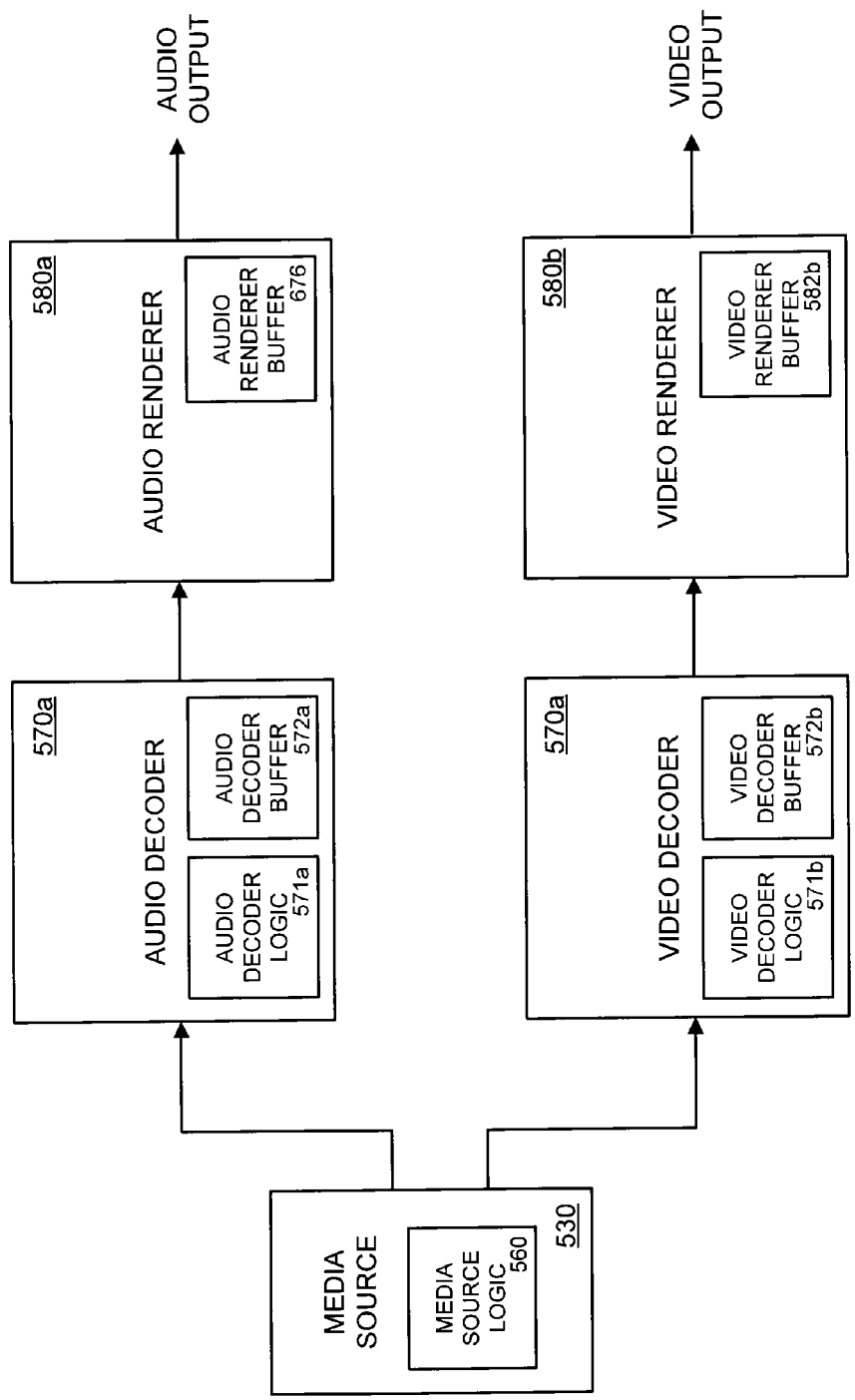

FIG. 6 illustrates a non-limiting example of a first embodiment of a method of providing an opportunity for saving power in a media player 304, 404. FIG. 6 will be discussed below with respect to FIGS. 7-9. FIGS. 7-8 illustrate block diagrams of the flow of data according to the entertainment system 300 of FIG. 3, the personal computer 400 of FIG. 4 or one of a variety of other embodiments including a media player 304, 404. FIG. 9 is a timing diagram illustrating an example of the timing of the decoder of the media player 304, 404 according to the first embodiment illustrated in FIG. 6. The method 600 of providing an opportunity for saving power in a media player 304, 404 includes blocks 605, 610, 615, 620, 625, 630, 635, 637, 638, 640, 645, 650, 655, 660, and 665.

In block 605, a data stream is sent from a media source 530 to a decoder 570 having a decoder buffer 572. In block 610, the data stream is stored as data in the decoder buffer 572. In block 615, the sending of the data stream from the media source 530 to the decoder 570 is stopped when the decoder buffer 572 is substantially full. A decoder logic 571, which may be included in the decoder 570 (FIG. 7) or external to the decoder 570 (FIG. 8), is configured to determine whether the decoder buffer 572 is substantially full.

In block 620, the data stored in the decoder buffer 572 is decoded using the decoder 570. In block 625, the decoded data is sent from the decoder 570 to a renderer 580 having a renderer buffer 582. In block 630, the decoded data is stored in the renderer buffer 582. In block 635, the decoding of the data stream is stopped when the renderer buffer 582 is substantially full. The decoder 570 includes decoder logic 571 configured to determine whether the renderer buffer 582 is substantially full. The decoding of the data stream is stopped when the decoder logic 571 has determined that the renderer buffer 582 is substantially full. In some embodiments, the decoder logic 571 is not included in the decoder 570 as illustrated in FIG. 8. In block 637, the decoder 570 is paused, and the decoder 570 transitions to a standby mode in block 638.

In block 640, the decoded data that is stored in the renderer buffer 582 is rendered using the renderer 580. In block 645, the decoder 570 determines, using the decoder logic 571, whether the decoded data stored in the renderer buffer 582 is almost depleted. The determination includes calculating a data transfer rate. The data transfer rate is calculated based at least in part on a source-to-decoder transfer rate and a decoder-to-renderer transfer rate. Further, the determination further includes calculating the render time needed to render the decoded data stored in the renderer buffer 582 based at least in part on the number of frames stored in the renderer buffer 582. The renderer buffer 582 is almost depleted when the render time needed to render the decoded data stored in the renderer buffer 582 is equivalent to the renderer buffer 582 size divided by the data transfer rate. In some embodiments, the data transfer rate is a constant or variable bitrate.

In block 650, responsive to a determination that the decoded data stored in the renderer buffer 582 is almost depleted, the media source 530 is notified to resume sending the data stream to the decoder 570. In block 655, the sending of the data stream from the media source 530 to the decoder 570 is resumed. In block 660, the data stored in the decoder buffer 572 is decoded using the decoder 570. In other words, the decoder buffer 572 transitions out of the standby mode and begins decoding data again. Similarly, in block 665, the decoded data stored in the renderer buffer 582 is rendered using the renderer 580.

The method 600 of providing an opportunity for saving power in a media player 304, 404, described above with respect to FIGS. 7-8, includes decoding and rendering a data stream. In some embodiments, however, more than one type of data stream, such as audio, video and/or subtitles, may be decoded and rendered. For example, FIG. 9 is a block diagram illustrating another example of the flow of data in the media player 304, 404 according to the first embodiment. Specifically, FIG. 9 illustrates a media source 530, an audio decoder 570a, an audio renderer 580a, a video decoder 570b, and a video renderer 580b. In FIG. 9, the audio decoder 570a includes an audio decoder logic 571a and an audio decoder buffer 572a, and the audio renderer 580a includes an audio renderer buffer 582a. The video decoder 570b includes a video decoder logic 571b and a video decoder buffer 572b, and the video renderer 580b includes a video renderer buffer 582b. Also, in some embodiments, the processing of the audio data stream and video data stream is synchronized such that both the audio decoder buffer 572a and the video decoder buffer 572b are substantially low or full at approximately the same time so that the media source 530 is capable of stopping sending the audio data stream at the same time that the media source 530 is capable of stopping sending video data stream.

Figure 10:
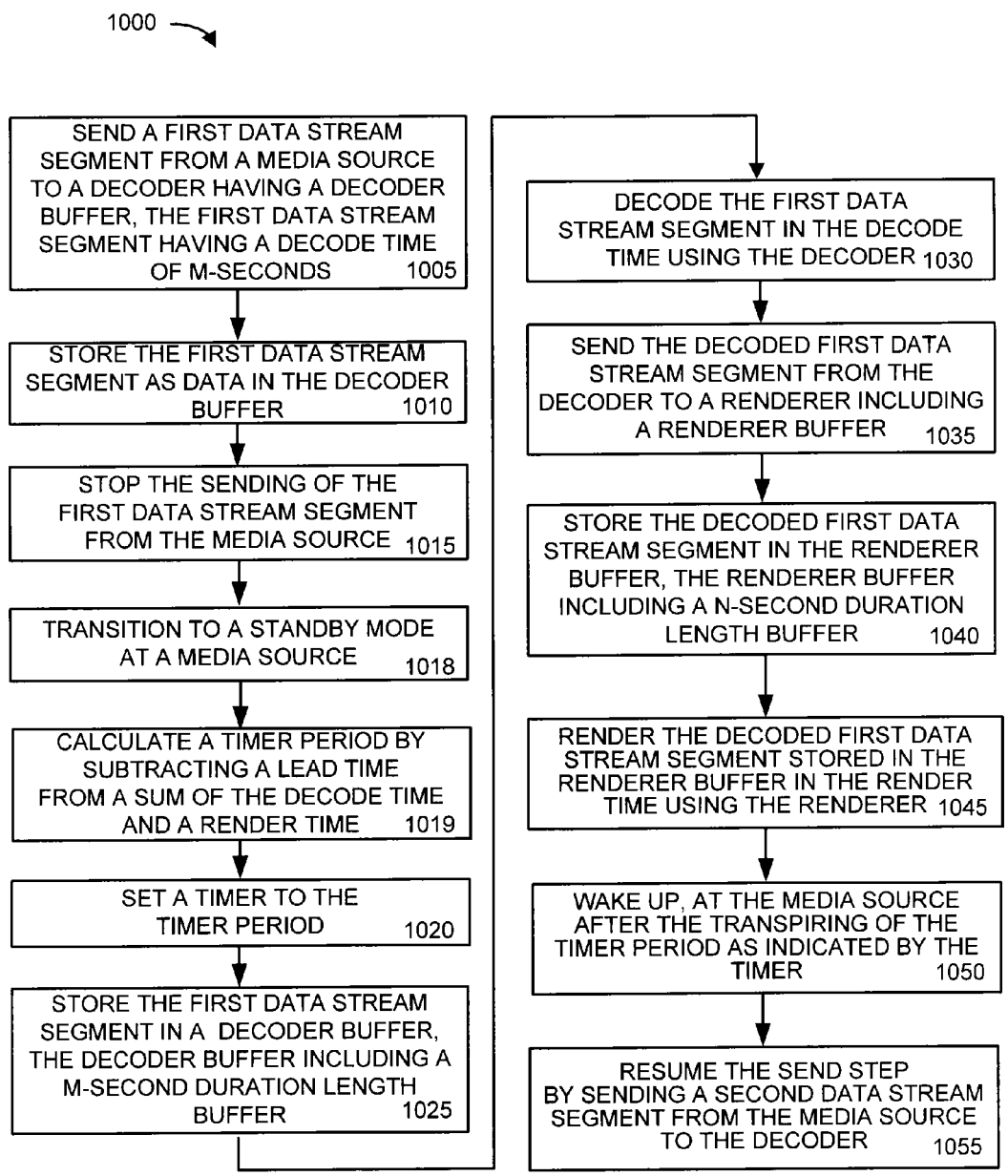
FIG. 10 is a flow chart illustrating a second embodiment of a method of providing an opportunity for saving power in a media player.

FIG. 10 is a flow chart illustrating a second embodiment of a method of providing an opportunity for saving power in a media player 304, 404. The method 1000 in FIG. 10 will be discussed below with respect to FIG. 11, which illustrates a block diagram of the flow of data according to the second embodiment in the entertainment system 300 of FIG. 3, the personal computer 400 of FIG. 4, or one of a variety of other embodiments including a media player 304, 404. Additionally, FIGS. 12 and 13, which illustrate a timing diagrams corresponding to the method 1000, will be referenced as well in the discussion of the method 1000.

Figure 11:
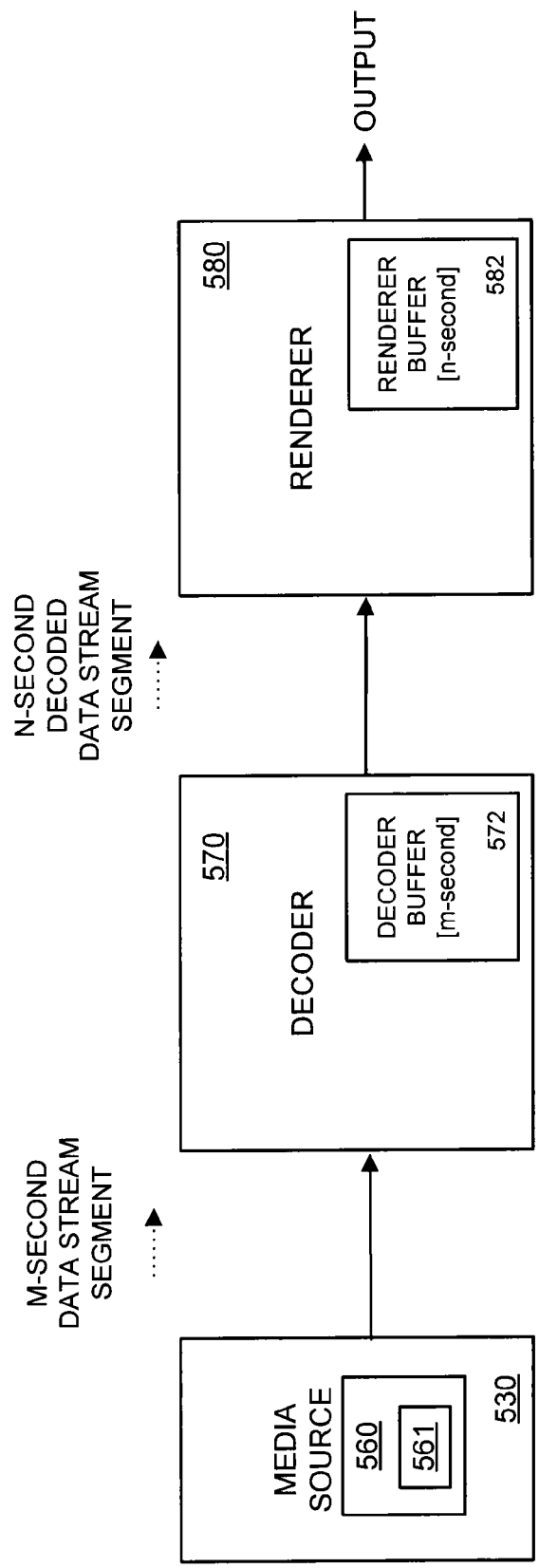
FIG. 11 is a block diagram illustrating an example of the flow of data in the media player according to the embodiment illustrated in FIG. 10.

FIG. 11 includes a media source 530, an decoder 570 including an decoder buffer 572 having an m-second length capacity, a renderer 580 including a renderer buffer 582 having an n-second length capacity. The media source 530 sends a data stream segment having an m-second length to the decoder 570 in p-seconds. Stated another way, the media source 530 is able to send a data stream to the decoder 570 faster than the decoder 570 is able to decode the data stream. Also, in the embodiment illustrated in FIG. 11, the media source 530 includes a media source logic 560, which includes a timer 561. In some embodiments, the timer 561 is not included in the media source logic 560. Also, in some embodiments, the media source logic 560 is not included in the media source 530.

Referring again to FIG. 10, the method 1000 of providing an opportunity for saving power in a media player 304, 404 includes blocks 1005, 1010, 1015, 1018, 1019, 1020, 1025, 1030, 1035, 1040, 1045, 1050, and 1055. In block 1005, a first data stream segment of media content is sent from a media source 530 to a decoder 570 having a decoder buffer 572. The first data stream segment has a playback duration of m-seconds, and the first data stream segment has a transfer time of p-seconds.

If the media content is encoded according to a constant bitrate, the m-second size of the first data stream segment can be determined based at least in part on the constant bitrate. If the media content is encoded according to a variable bitrate, the media source 530 can parse the video and audio stream and determine a decode time stamp (DTS) or a present time stamp (PTS) to determine the m-second size of the first data stream segment. In some embodiments, the data segment size is different for audio content and video content. In those embodiments, the data segment sizes for audio content and video content (e.g., m-seconds and m'-seconds, respectively) can be separately determined in the manner discussed above.

Figure 12:
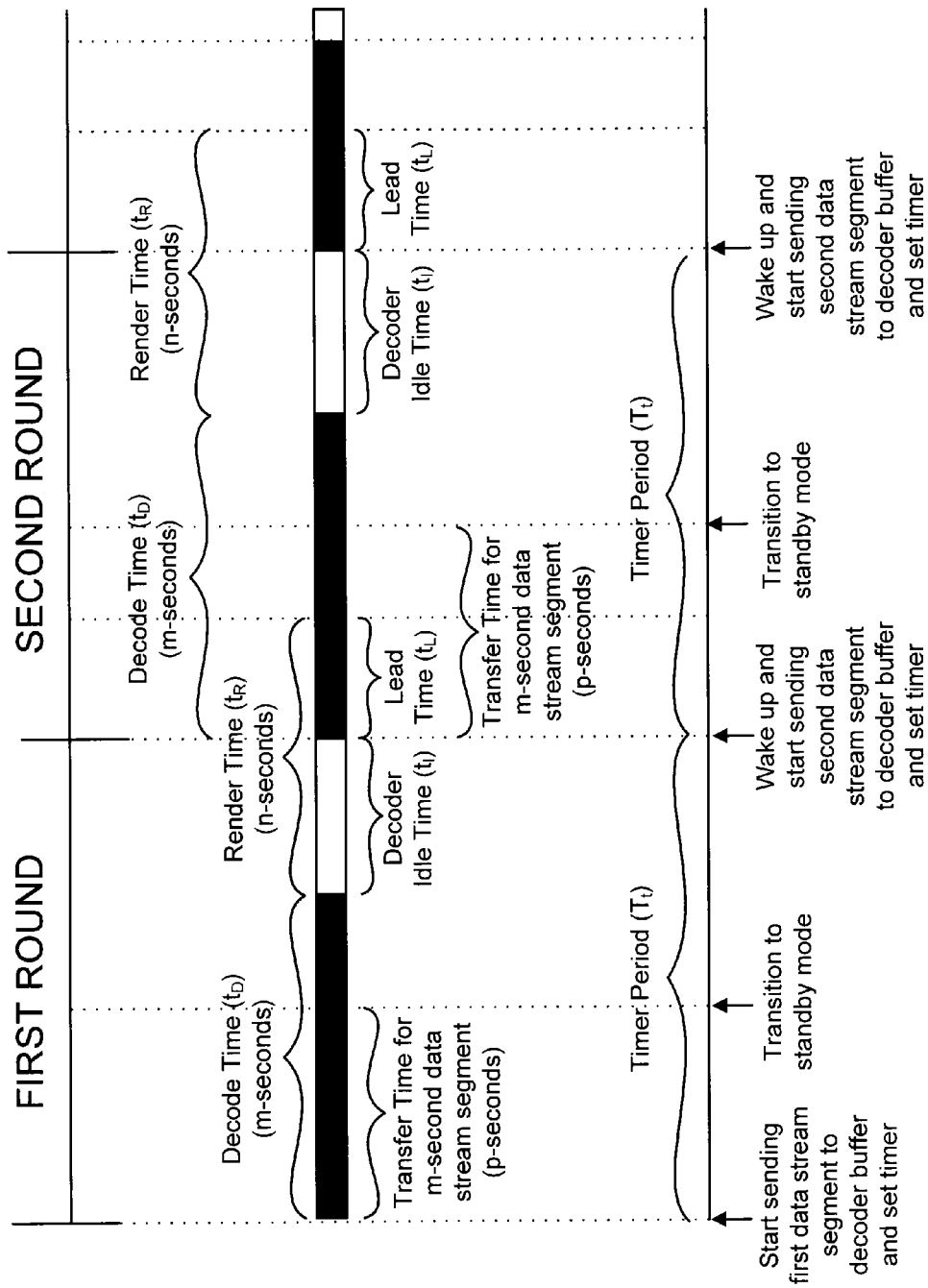
FIG. 12 is a timing diagram illustrating an example of the timing of the method according to the embodiment illustrated in FIG. 10.
Figure 13:
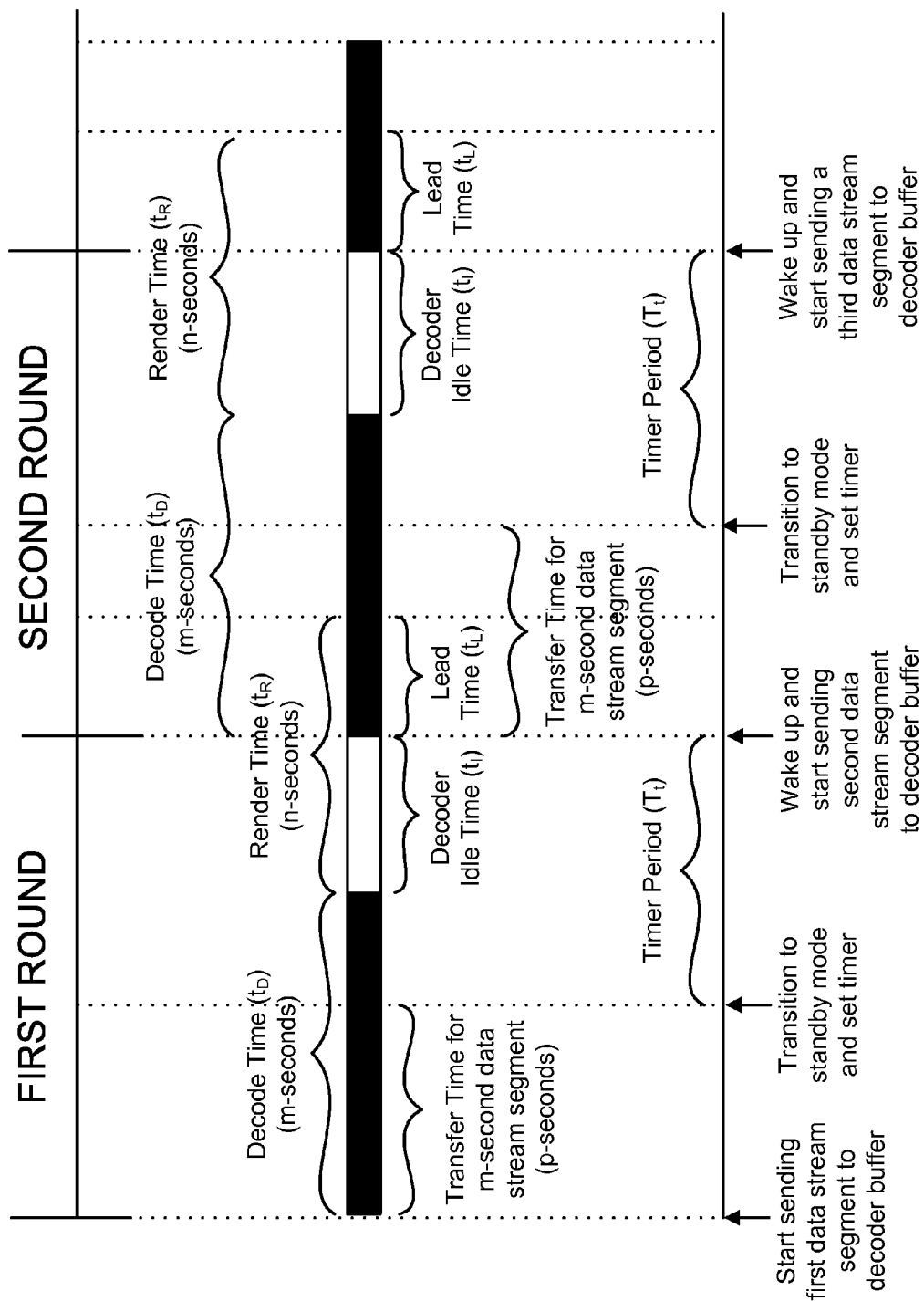
FIG. 13 is a timing diagram illustrating another example of the timing of the method according to the embodiment illustrated in FIG. 10.

In block 1010, the first data stream segment is stored as data in the decoder buffer 572. FIGS. 12 and 13 also illustrate the beginning of the sending of the first data stream segment from the media source 530 to the decoder 570. As depicted in FIGS. 12 and 13, the decoder 570 is able to decode the first data stream segment in m-seconds, but the media source 530 can transfer the first data stream segment in p-seconds. The media source 530 transfers the first data stream segment at a media source-to-decoder transfer rate.

In block 1015, the sending of the first data stream segment from the media source 530 to the decoder 570 is stopped. Specifically, as depicted in FIGS. 12 and 13, after p-seconds, which is the amount of time for sending the first data stream segment to the decoder 570, the media source 530 stops sending the first data stream segment. In some embodiments, the first data stream segment is sent in p-seconds.

In block 1018, the media source 530 transitions to a standby mode. When the media source 530 is in the standby mode, the media player 304, 404 is able to save power. In some embodiments, such as in block 1019, a timer period ($T_t$) is calculated as illustrated in Eqn. (1) by subtracting a lead time ($t_L$) from the sum of a decode time ($t_D$), which is m-seconds, plus a render time ($t_R$), which is n-seconds.

$$T_t = t_D + t_R - t_L \quad (1)$$

This example of a timer period ($T_t$) is illustrated in FIG. 12.

In other embodiments, the timer period ($T_t$) is calculated as illustrated in Eqn. (2) by subtracting the sum of a lead time ($t_L$) plus a transfer time ($t_T$) from the sum of a decode time ($t_D$), which is m-seconds, plus a render time ($t_R$), which is n-seconds.

$$T_t = t_D + t_R - (t_L + t_T) \quad (2)$$

This example of a timer period ($T_t$) is illustrated in FIG. 13.

The lead time ($t_L$) is substantially equivalent to a data playback rate (B bits/s) of the renderer 580 times the renderer buffer 582 size in units of time (n-seconds) and divided by a data transfer rate (S bits/s).

$$t_L = \frac{Bn}{S} \quad (3)$$

The data transfer rate (S bits/s) is effectively a transfer rate of data from the media source 530 to the renderer 580. Accordingly, the data transfer rate (S bits/s) is a function of the media source-to-decoder transfer rate (S1 bits/s) and the decoder-to-renderer transfer rate (S2 bits/s).

In block 1020, a timer 561 is set to the calculated timer period. In block 1025, the first data stream segment is stored in a decoder buffer 572 including an m-second duration length buffer. Additionally, in block 1030, the first data stream segment is decoded in the decode time using the decoder 570. The decoded first data stream segment is sent from the decoder 570 to a renderer 580 including a renderer buffer 582 in block 1035.

In block 1040, the decoded first data stream segment is stored in the renderer buffer 582, the renderer buffer 582 includes a n-second duration length buffer. In block 1045, the decoded first data stream segment that is stored in the renderer buffer 582 is rendered in a render time using the renderer 580. In block 1050, the media source 530 wakes up after the transpiring of the timer period as indicated by the timer 561. In block 1055, the send step is resumed by sending a second data stream segment from the media source 530 to the decoder 570.

Figure 14:
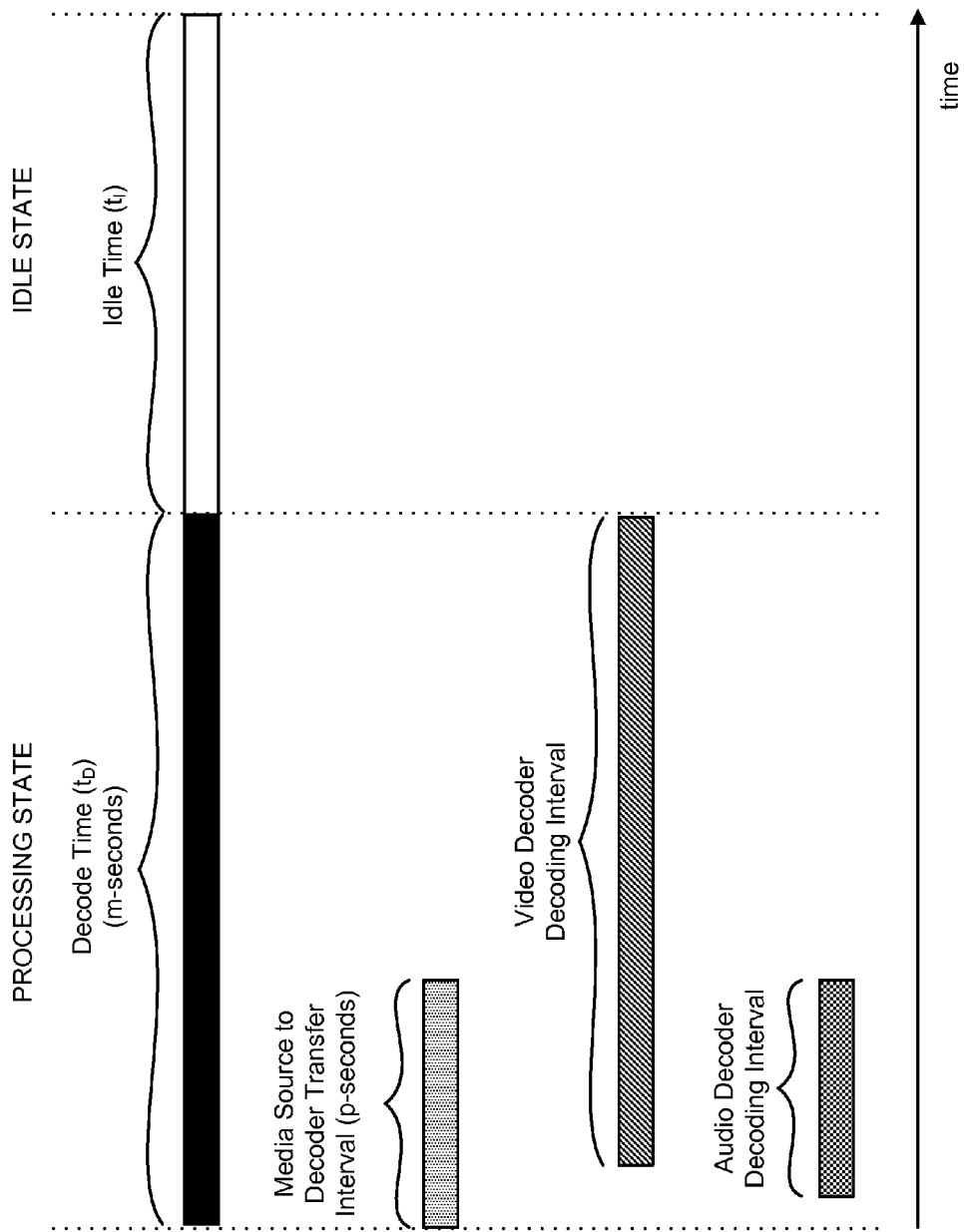
FIG. 14 is a state diagram illustrating an example of a timing of a plurality of process intervals during a processing state of a decoder.

FIG. 14 is a state diagram illustrating an example of a timing of a plurality of process intervals during a processing state of a decoder 570. In some embodiments, the process intervals include a data streaming interval, a video decoding interval, and an audio decoding interval. In the embodiment illustrated in FIG. 14, the data streaming interval, the video decoding interval, and the audio decoding interval occur during the decode time $t_D$ and take less time than m-seconds. Also, in this embodiment, during the idle state of the decoder 570, no transfer from the media source 530 to a decoder 570 or video or audio decoding occurs.

Any process descriptions or blocks in flow charts should be understood as representing modules, segments, or portions of code which include one or more executable instructions for implementing specific logical functions or steps in the process, and alternate implementations are included within the scope of the embodiments described in the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments in the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method of providing an opportunity for saving power in a media player having a processor by controlling the processor usage, the method comprising:
    sending a data stream from a media source to a decoder having a decoder buffer;
    stopping the sending of the data stream from the media source when the decoder buffer of the decoder is substantially full;
    decoding data stored in the decoder buffer using the decoder;
    sending decoded data to a renderer having a renderer buffer;
    stopping the decoding of the data when the renderer buffer is substantially full;
    determining, using a decoder logic, whether the decoded data stored in the renderer buffer is almost depleted, wherein the determining includes calculating a data transfer rate;
    responsive to a determination by the decoder logic that decoded data stored in the renderer buffer is almost depleted, notifying the media source to resume sending the data stream to the decoder, and
    repeating the decoding and rendering steps.

2. The method of claim 1, wherein the data transfer rate is calculated based at least in part on a source-to-decoder transfer rate and a decoder-to-renderer transfer rate.

3. The method of claim 1, wherein the determining further includes calculating the render time needed to render the decoded data stored in the renderer buffer based at least in part on the number of frames stored in the renderer buffer.

4. The method of claim 3, wherein the renderer buffer is almost depleted when the render time needed to render the decoded data stored in the renderer buffer is equivalent to the renderer buffer size divided by the data transfer rate.

5. The method of claim 4, wherein the render time is based at least in part on the number of frames of decoded data stored in the renderer buffer.

6. The method of claim 1, wherein the data transfer rate is a constant or variable bitrate.

7. The method of claim 1, further comprising:
    pausing the decoder; and
    transitioning to a standby mode at the decoder.

8. A method of playing media in a media player, the method comprising:
    sending a first data stream segment from a media source to a decoder, the first data stream segment having a decode time of m-seconds;
    stopping the sending of the first data stream segment from the media source;
    transitioning to a standby mode at the media source;
    storing the first data stream segment in a decoder buffer, the decoder buffer including a m-second duration length buffer;
    decoding the first data stream segment in the decode time using the decoder;

sending the decoded first data stream segment from the decoder to a renderer;

storing the decoded first data stream segment in a renderer buffer, the renderer buffer including a n-second duration length buffer;

rendering the decoded first data stream segment stored in the renderer buffer in a render time using the renderer; and resuming the sending step by sending a second data stream segment from the media source to the decoder after a timer period based at least in part on a lead time.

9. The method of claim 8, wherein the timer period equals the sum of the decode time plus the render time minus a lead time.

10. The method of claim 8, wherein the timer period equals the sum of the decode time plus the render time minus the sum of the lead time plus a transfer time.

11. The method of claim 10, wherein the media source is configured to calculate the transfer time required to send the first data stream segment from the media source to the decoder based at least in part on the media source-to-decoder transfer rate, wherein the transfer time is equal to p-seconds.

12. The method of claim 8, wherein the lead time is substantially equivalent to a data playback rate times the render time and divided by a data transfer rate.

13. The method of claim 8, wherein the data transfer rate is a constant or variable bitrate.

14. The method of claim 8, wherein the data transfer rate is calculated based at least in part upon a media source-to-decoder transfer rate and a decoder-to-renderer transfer rate.

15. The method of claim 8, further comprising:
calculating the timer period by subtracting the lead time from the sum of m-seconds and n-seconds;
setting a timer to the timer period;
waking up, at the media source; and
repeating the sending step after a transpiring of the timer period.

16. A media player comprising:
a media source including a data stream;
a decoder including a decoder buffer and a decoder logic, wherein the media source is configured to send a data stream to the decoder, wherein the media source is further configured to stop sending the data stream when the decoder buffer is substantially full, the decoder being configured to send decoded data to the renderer; and
a renderer including a renderer buffer, wherein the renderer buffer is configured to store decoded data, wherein the decoder is configured to stop decoding data when the renderer buffer is substantially full,
wherein the media source is configured to stop sending the data stream when the decoder buffer is substantially full;
wherein the decoder logic is configured to determine whether the renderer buffer is almost depleted including calculate a data transfer rate,
wherein the decoder logic is further configured to send a notification to the media source responsive to a determination that the renderer buffer is almost depleted, the notification notifying the media source to resume sending the data stream to the decoder.

17. The media player of claim 16, wherein the data transfer rate is calculated based at least in part on a source-to-decoder transfer rate and a decoder-to-renderer transfer rate.

18. The media player of claim 16, wherein the decoder logic is further configured to calculate the render time needed to render the decoded data stored in the renderer buffer based at least in part on the number of frames stored in the renderer buffer.

19. The media player of claim 18, wherein the renderer buffer is almost depleted when the render time needed to render the decoded data stored in the renderer buffer is equivalent to the renderer buffer size divided by the data transfer rate.

20. The media player of claim 19, wherein the render time is based at least in part on the number of frames of decoded data stored in the renderer buffer.

21. The media player of claim 16, wherein the data transfer rate is a constant or variable bitrate.

22. The media player of claim 16, wherein the decoder is further configured to pause and transition to a standby mode when the renderer buffer is substantially full.

23. A media player comprising:
a media source including a data stream;
a decoder including a decoder buffer, the media source being configured to send a first data stream segment having a decode time of m-seconds from a media source to a decoder, the media source being further configured to transition to a standby mode after sending the first data stream segment, wherein the decoder buffer is configured to store at most an m-second data stream segment; and
a renderer including a renderer buffer, wherein the renderer buffer is configured to store at most an n-second segment of the data stream decoded by a decoder, the renderer being configured to render the n-second segment in a render time,
wherein the media source is configured to send a second data stream segment from the media source to the decoder after a timer period based at least in part on a lead time.

24. The media player of claim 23, wherein the timer period equals the sum of the decode time plus the render time minus a lead time.

25. The media player of claim 23, wherein the timer period equals the sum of the decode time plus the render time minus the sum of the lead time plus a transfer time.

26. The media player of claim 23, wherein the lead time is substantially equivalent to a data playback rate times the render time and divided by a data transfer rate.

27. The media player of claim 26, wherein the data transfer rate is calculated based at least in part upon a media source-to-decoder transfer rate and a decoder-to-renderer transfer rate.

28. The media player of claim 26, wherein the data transfer rate is a constant or variable bitrate.

* * * * *